United States Patent
Hsu et al.

(10) Patent No.: US 8,810,677 B2
(45) Date of Patent: Aug. 19, 2014

(54) IMAGE PROCESSING APPARATUS AND PROCESSING METHOD THEREOF

(75) Inventors: Chi-Tung Hsu, Hsinchu (TW); Shih-Fang Chuang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 437 days.

(21) Appl. No.: 13/335,953

(22) Filed: Dec. 23, 2011

(65) Prior Publication Data

US 2013/0128061 A1 May 23, 2013

(30) Foreign Application Priority Data

Nov. 22, 2011 (TW) .............................. 100142683 A

(51) Int. Cl.
*H04N 5/228* (2006.01)
*H04N 5/217* (2011.01)
*H04N 9/04* (2006.01)

(52) U.S. Cl.
CPC ............... *H04N 5/217* (2013.01); *H04N 9/045* (2013.01)
USPC ...................... 348/222.1; 348/241; 348/208.4

(58) Field of Classification Search
None
See application file for complete search history.

(56) References Cited

U.S. PATENT DOCUMENTS

| | | | |
|---|---|---|---|
| 2004/0027454 A1* | 2/2004 | Vella et al. | 348/155 |
| 2009/0185078 A1* | 7/2009 | Van Beek et al. | 348/624 |
| 2011/0069906 A1* | 3/2011 | Park et al. | 382/284 |

FOREIGN PATENT DOCUMENTS

| | | |
|---|---|---|
| TW | 200644613 | 12/2006 |
| TW | 200707328 | 2/2007 |
| TW | 200849977 | 12/2008 |
| TW | 201140423 | 11/2011 |

OTHER PUBLICATIONS

"Office Action of Taiwan Counterpart Application", issued on Jan. 15, 2014, p. 1-p. 8.

* cited by examiner

*Primary Examiner* — Justin P Misleh
(74) *Attorney, Agent, or Firm* — Jianq Chyun IP Office

(57) ABSTRACT

An image processing apparatus and a processing method thereof are provided. The image processing apparatus includes an image capturing module, an image separation module, an image stabilization module, a temporal noise reduction module, and a spatial noise reduction module. The image capturing module captures a plurality of Bayer pattern images. The image separation module decreases the Bayer pattern images in size and transforms them into a plurality of YCbCr format images. The image stabilization module receives Y channel images of the YCbCr format images and the Bayer pattern images to perform motion estimation, to produce a plurality of global motion vectors (GMVs). The temporal noise reduction module performs temporal blending process on the Bayer pattern images according to the GMVs, to produce first noise reduction images. The spatial noise reduction module performs 2-dimensional spatial noise reduction on the first noise reduction images to produce second noise reduction images.

14 Claims, 5 Drawing Sheets

IMAGE PROCESSING APPARATUS AND PROCESSING METHOD THEREOF

CROSS-REFERENCE TO RELATED APPLICATION

This application claims the priority benefit of Taiwan application serial no. 100142683, filed on Nov. 22, 2011. The entirety of the above-mentioned patent application is hereby incorporated by reference herein and made a part of this specification.

BACKGROUND OF THE INVENTION

1. Field of the Invention

The present invention generally relates to an image processing apparatus and a processing method thereof, and more particularly to an image processing apparatus capable of performing spatial/temporal noise reduction and a processing method thereof.

2. Description of Related Art

The sophisticated advancement of the multimedia technology leads to an increasingly high requirement for high definition images at present. The quality of an image is highly correlated to noises concomitantly generated in image capturing, and signal transformation and transmission. In order to effectively reduce the noises to improve the image quality, more and more attentions are paid to the research of reduction of noises in the filed of image processing.

FIG. 1 is a block diagram of a conventional image processing apparatus 100. Referring to FIG. 1, an image capturing module 110 is used for capturing Bayer pattern images, and then the Bayer pattern images are corrected by a Vertical Distortion Correction (VDC) module 120 to compensate the vertical distortion. Subsequently, an Image Reproduce Pipeline (IRP) module 130 transforms the Bayer pattern images into YCbCr format images, and then transfers the transformed YCbCr format images to a geometric transform module 140 to perform geometric compensation so as to correct the problem of distortion caused by a lens in capturing of the images. Because image distortion is easily caused by shaking or quiver of the hand in the capturing of the images, the YCbCr format images are decreased in size by a scaling module 150, and then an image stabilization module 160 performs motion estimation and motion correction by using decreased Y channel images and originally sized Y channel images. Finally, a 2-dimensional noise reduction module 170 performs 2-dimensional spatial noise reduction on each image, to produce images which can be stored or played.

Images Img1~Img5 as shown in FIG. 1 represent that at a position between different modules, the images must be stored by a Dynamic Random Access Memory (DRAM) for being processed by a Central Processing Unit (CPU) through operation. However, the capacity of the DRAM of the image processing apparatus 100 is limited, and thus for the architecture of the image processing apparatus 100 as shown in FIG. 1, most of the capacity of the DRAM is occupied, so that the conventional image processing apparatus 100 cannot accommodate other processing modules.

SUMMARY OF THE INVENTION

In view of foregoing, the present invention is directed to an image processing apparatus and a processing method thereof, through which temporal noise reduction can be performed on Bayer pattern images by using information generated by an image stabilization module, thereby improving the image quality.

From a point of view, the present invention provides an image processing apparatus, which includes an image capturing module, an image separation module, an image stabilization module, a temporal noise reduction module, and a spatial noise reduction module. The image capturing module captures a plurality of Bayer pattern images. The image separation module is coupled to the image capturing module, decreases the Bayer pattern images in size and transforms them into a plurality of first YCbCr format images. The image stabilization module is coupled to the image capturing module and the image separation module, and used for receiving Y channel images of the first YCbCr format images and the Bayer pattern images to perform motion estimation, so as to produce a plurality of global motion vectors (GMVs). The temporal noise reduction module is coupled to the image capturing module and the image stabilization module, and performs a temporal blending process on the Bayer pattern images according to the global motion vectors, to produce a plurality of first noise reduction images. The spatial noise reduction module is coupled to the temporal noise reduction module and performs 2-dimensional spatial noise reduction on the first noise reduction images to produce a plurality of second noise reduction images.

In an embodiment of the present invention, the temporal noise reduction module aligns the Bayer pattern images according to the global motion vectors, and performs the temporal blending process on color and brightness differences between the Bayer pattern images, to produce the first noise reduction images.

In an embodiment of the present invention, the image processing apparatus further includes a VDC module coupled to the image capturing module and the image stabilization module. The VDC module is used for receiving the Bayer pattern images, performing lens distortion correction on the Bayer pattern images, and transferring the corrected Bayer pattern images to the image stabilization module for being processed.

In an embodiment of the present invention, the spatial noise reduction module includes an IRP unit coupled to the temporal noise reduction module. The IRP unit transforms the first noise reduction images into a plurality of second YCbCr format images.

In an embodiment of the present invention, the spatial noise reduction module includes a geometric transform unit coupled to the IRP unit. The geometric transform unit corrects the second YCbCr format images according to a plurality of affine transformation matrices, so as to compensate geometric distortion.

In an embodiment of the present invention, the spatial noise reduction module includes a sharpening and noise reduction unit coupled to the geometric transform unit. The sharpening and noise reduction unit performs a sharpening process on Y channel images of the second YCbCr format images, and performs 2-dimensional spatial noise reduction on Cb/Cr channel images of the second YCbCr format images, to produce the second noise reduction images.

In an embodiment of the present invention, the image processing apparatus further includes a compression module coupled to the spatial noise reduction module. The compression module compresses the second noise reduction images, and stores the compressed second noise reduction images.

In an embodiment of the present invention, the image processing apparatus further includes a display module coupled to the spatial noise reduction module, for playing the second noise reduction images.

From another point of view, the present invention provides an image processing method, which includes the following steps. First, a plurality of Bayer pattern images is captured. The Bayer pattern images are decreased in size and transformed to produce a plurality of first YCbCr format images. Then, Y channel images of the first YCbCr format images and the Bayer pattern images are received to perform motion estimation, so as to produce a plurality of global motion vectors. A temporal blending process is performed on the Bayer pattern images according to the global motion vectors, to produce a plurality of first noise reduction images. 2-dimensional spatial noise reduction is further performed on the first noise reduction images to produce a plurality of second noise reduction images.

In an embodiment of the present invention, the step of performing the temporal blending process on the Bayer pattern images according to the global motion vectors to produce the first noise reduction images includes aligning the Bayer pattern images according to the global motion vectors, and performing the temporal blending process on color and brightness differences between the Bayer pattern images, to produce the first noise reduction images.

In an embodiment of the present invention, after the step of capturing the Bayer pattern images, the method further includes performing VDC on the Bayer pattern images.

In an embodiment of the present invention, the step of performing the 2-dimensional spatial noise reduction on the first noise reduction images to produce the second noise reduction images includes the following steps. The first noise reduction images are transformed into a plurality of second YCbCr format images. The second YCbCr format images are corrected according to a plurality of affine transformation matrices, so as to compensate geometric distortion. Furthermore, a sharpening process is performed on Y channel images of the second YCbCr format images, and 2-dimensional spatial noise reduction is performed on Cb/Cr channel images of the second YCbCr format images, to produce the second noise reduction images.

In an embodiment of the present invention, after the step of producing the second noise reduction images, the method further includes compressing the second noise reduction images, and storing the compressed second noise reduction images.

In an embodiment of the present invention, after the step of producing the second noise reduction images, the method further includes transferring the second noise reduction images to a display module for playing the second noise reduction images.

Based on the above, in case of limited capacity of a DRAM, through the image processing apparatus and the processing method thereof provided in the present invention, the temporal noise reduction is performed on the Bayer pattern images by using the information generated by the image stabilization module, and the spatial noise reduction is also performed on the Bayer pattern images, thereby improving the image quality significantly.

In order to make the features and advantages of the present invention more comprehensible, the present invention is described in detail below with embodiments and accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
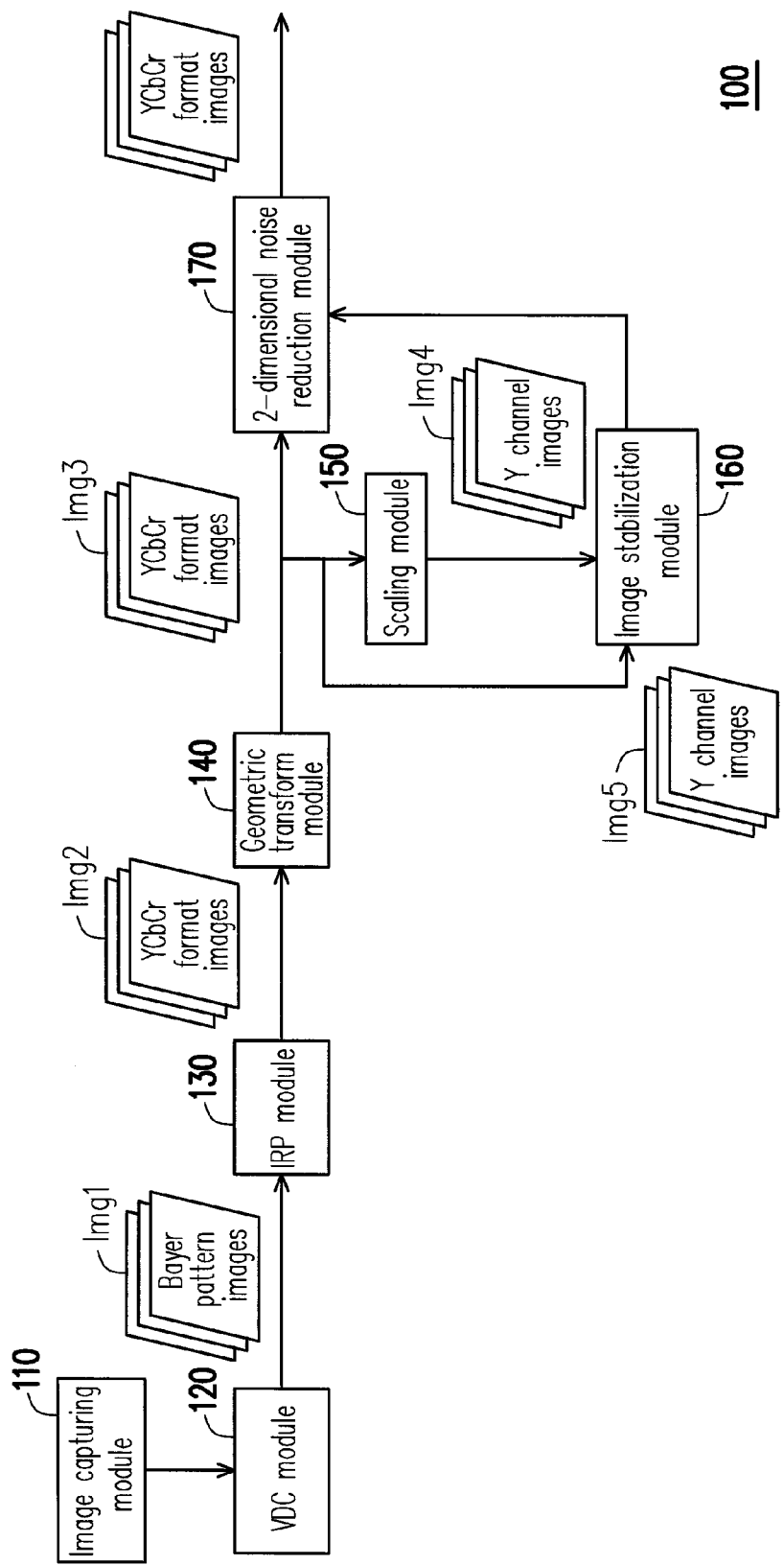
FIG. 1 is a block diagram of a conventional image processing apparatus.
Figure 2:
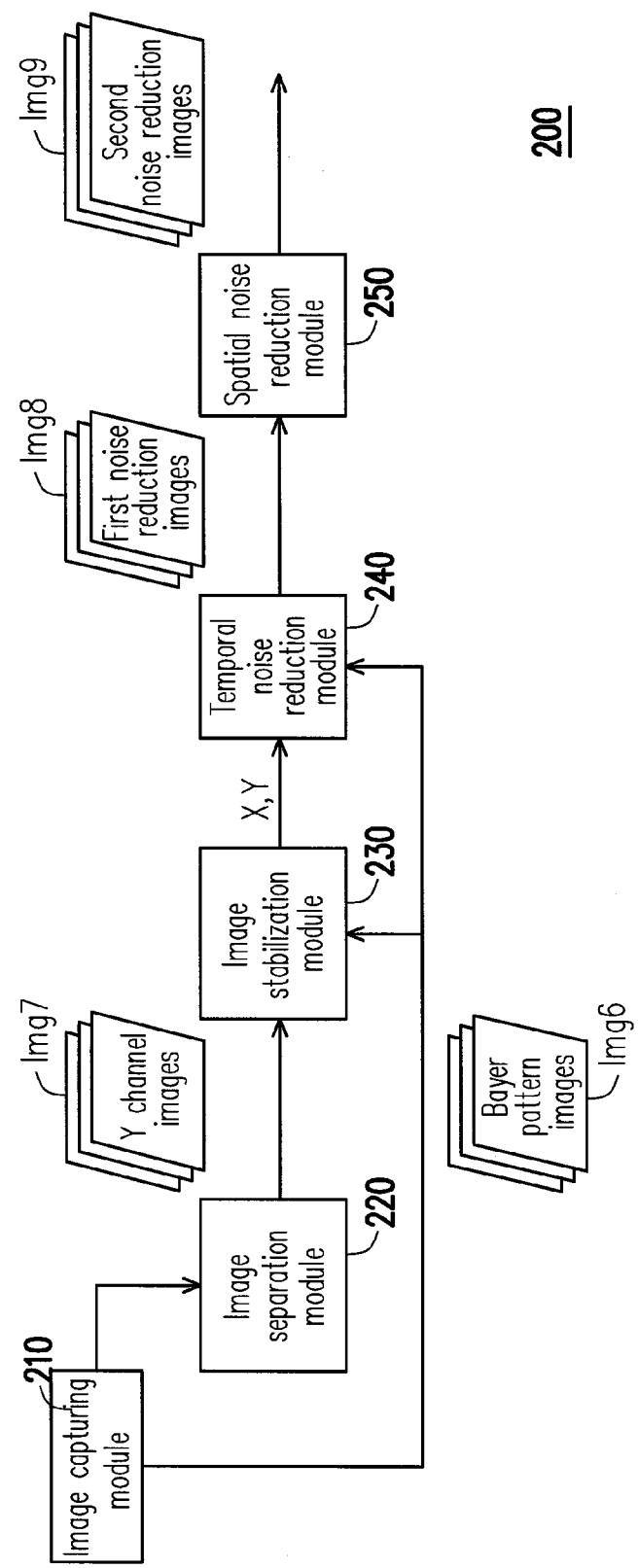
FIG. 2 is a block diagram of an image processing apparatus according to an embodiment of the present invention.

FIG. 2 is a block diagram of an image processing apparatus according to an embodiment of the present invention. Referring to FIG. 2, an image processing apparatus 200 in this embodiment is, for example, but not limited to, a digital camera, a single lens reflex camera, a digital video recorder or other intelligent mobile phones having an image processing function, and a tablet computer. The image processing apparatus 200 includes an image capturing module 210, an image separation module 220, an image stabilization module 230, a temporal noise reduction module 240, and a spatial noise reduction module 250. The functions thereof are respectively described as follows.

The image capturing module 210 may include a lens, a photosensitive element and an aperture, and is used for capturing Bayer pattern images. The image separation module 220 mainly includes two functions, one is to decrease the Bayer pattern images in size, and the other one is to transform Bayer pattern images into a plurality of first YCbCr format images. The image stabilization module 230 performs motion estimation, and can implement motion correction. The temporal noise reduction module 240 can perform a temporal blending process on the images, to achieve the purpose of noise reduction. The spatial noise reduction module 250 performs 2-dimensional spatial noise reduction on the images. All the modules above are formed by hardware. The hardware is, for example, a Microprocessor, a Digital Signal Processor (DSP) or other similar apparatuses, for a general purpose or a special purpose.

Figure 3:
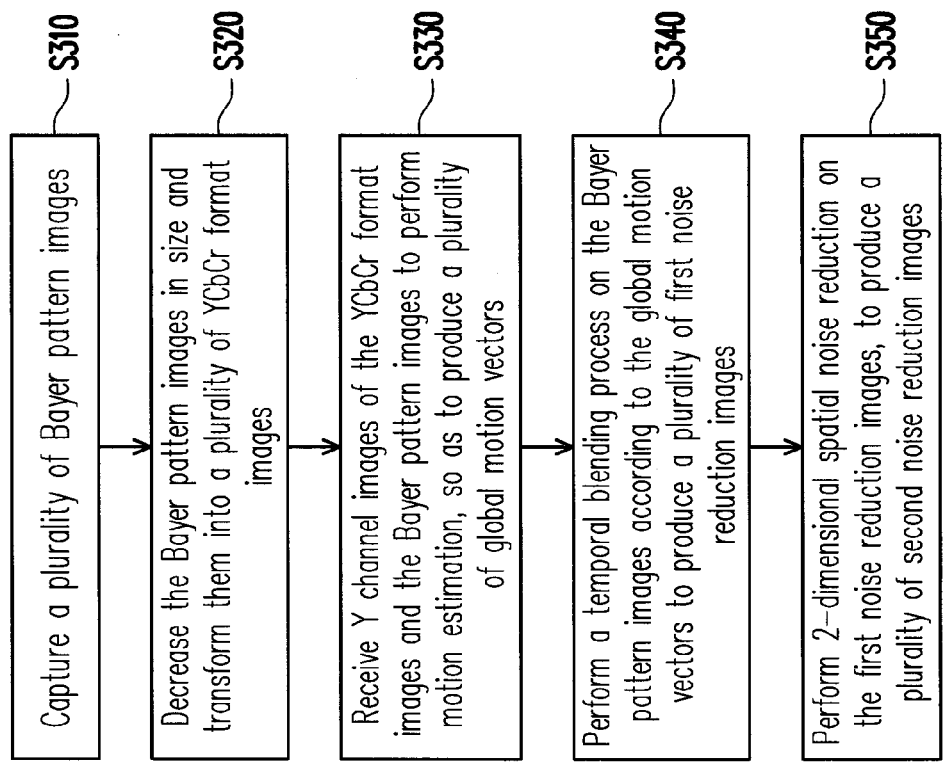
FIG. 3 is a flow chart of an image processing method according to an embodiment of the present invention.

FIG. 3 is a flow chart of an image processing method according to an embodiment of the present invention. Referring to FIG. 3, the method in this embodiment is applicable to the image processing apparatus 200 shown in FIG. 2, and details for steps of the image processing method in this embodiment are described below with reference to the modules shown in FIG. 2.

First, as described in Step S310, the image capturing module 210 captures a plurality of Bayer pattern images Img6, and transfers the Bayer pattern images Img6 respectively to the image separation module 220, the image stabilization module 230, and the temporal noise reduction module 240 for being further processed. In Step S320, the image separation module 220 decreases the Bayer pattern images in size and transforms the Bayer pattern images into a plurality of first YCbCr format images, in which the scale of decrease may be set according to practical requirements. It should be particularly noted herein that the image separation module 220 can directly decrease the Bayer pattern images Img6 captured by the image capturing modules 210 in size, without being read by a DRAM, thereby saving the bandwidth of the DRAM.

Then, in Step S330, the image stabilization module 230 receives Y channel images Img7 of the first YCbCr format images generated by the image separation module 220, performs motion estimation by using the Y channel images Img7 and the Bayer pattern images Img6 to produce a plurality of global motion vectors, and the x-component of the global motion vectors X and the y-component of the global motion vectors Y are transferred to the temporal noise reduction module 240. A manner for calculating the global motion vectors is not limited in the present invention.

As described in Step S340, the temporal noise reduction module 240 receives the global motion vectors X,Y generated by the image stabilization module 230, and performs a temporal blending process on the Bayer pattern images Img6 according to the global motion vectors X,Y, to produce a plurality of first noise reduction images Img8, in which the first noise reduction images Img8 are still Bayer pattern format images. More specifically, the temporal noise reduction module 240 aligns the plurality of Bayer pattern images Img6 according to the global motion vectors X,Y, and performs the temporal blending process on color and brightness differences between the Bayer pattern images Img6 by using different weights, to produce the first noise reduction images Img8. The so-called performing of the temporal blending process according to the color and brightness differences by using different weights is to avoid the occurrence of ghost to the first noise reduction images Img8 due to unsuitable blending process in case that the color and brightness differences between the plurality of Bayer pattern images Img6 are excessively large.

Figure 4:
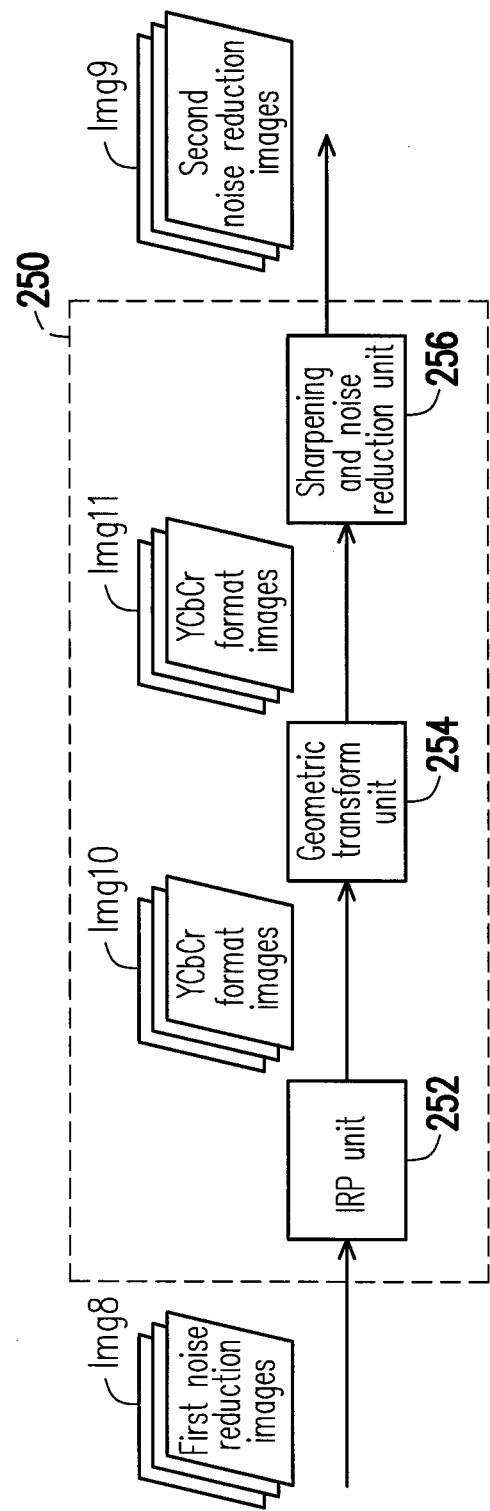
FIG. 4 is an implementation of a spatial noise reduction module 250 according to an embodiment of the present invention.

In the following Step S350, the spatial noise reduction module 250 coupled to the temporal noise reduction module 240 performs 2-dimensional spatial noise reduction on the first noise reduction images Img8, to produce a plurality of second noise reduction images Img9, in which the second noise reduction images Img9 are second YCbCr format images with a size grater than that of the first YCbCr format images. For example, the size of the first YCbCr format images is, for example, 320×160; and the size of the second YCbCr format images is, for example, 1280×720. The spatial noise reduction module 250 may include, for example, a geometric compensation function for compensating lens distortion, a sharpening function, and a 2-dimensional noise reduction function. FIG. 4 is an implementation of a spatial noise reduction module 250 according to an embodiment of the present invention. Referring to FIGS. 2 and 4, the spatial noise reduction module 250 includes an Image Reproduce Pipeline (IRP) unit 252, a geometric transform unit 254, and a sharpening and noise reduction unit 256.

The IRP unit 252 transforms the first noise reduction images Img8 received from the temporal noise reduction module 240 into a plurality of second YCbCr format images Img10. Then, the geometric transform unit 254 receives the second YCbCr format image Img10, and corrects the second YCbCr format images Img10 according to a plurality of affine transformation matrices, to compensate geometric distortion or to perform geometric correction. Finally, in this embodiment, the sharpening and noise reduction unit 256 coupled to the geometric transform unit 254 performs a sharpening process on Y channel images of the second YCbCr format images Img11, and performs 2-dimensional spatial noise reduction on Cb/Cr channel images of the second YCbCr format images Img11, to produce the second noise reduction images Img9.

As shown in FIG. 2, in this embodiment, the temporal noise reduction module 240 performs the temporal blending process and the spatial noise reduction module 250 performs the 2-dimensional spatial noise reduction, so as to achieve an effect of 3-Dimensional Noise Reduction (3DNR). Based on this, an image processing apparatus with a high frame rate and a high resolution can effectively eliminate noises in images taken by the image processing apparatus following the steps shown in FIG. 3, thereby improving the image quality.

Figure 5:
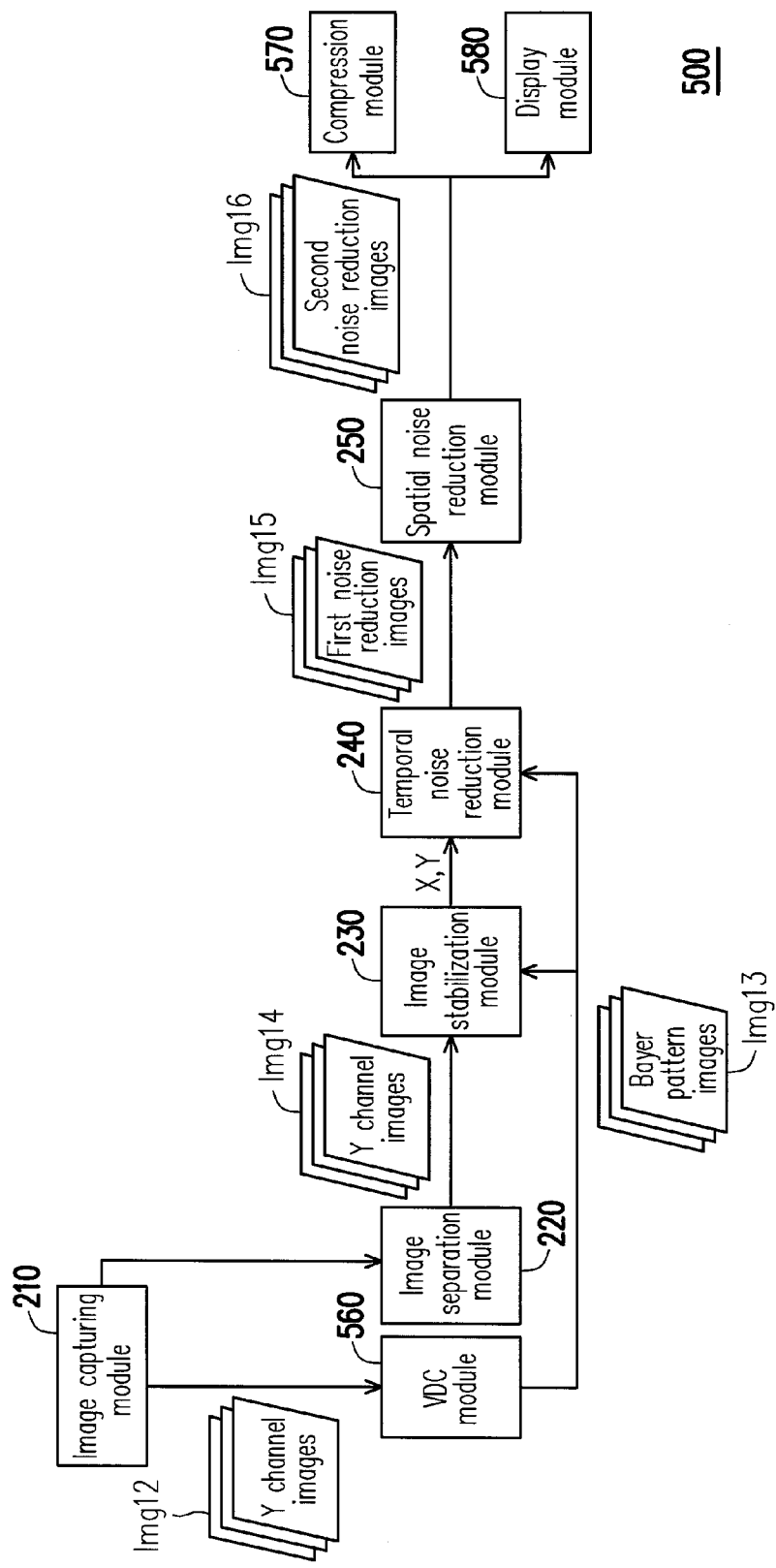
FIG. 5 is a block diagram of an image processing apparatus according to another embodiment of the present invention.

Hereinafter, description is made with reference to another exemplary embodiment. FIG. 5 is a block diagram of an image processing apparatus according to another embodiment of the present invention. Referring to FIG. 5, in this embodiment, an image processing apparatus 500 further includes, in addition to the image capturing module 210, the image separation module 220, the image stabilization module 230, the temporal noise reduction module 240 and the spatial noise reduction module 250, a VDC module 560, a compression module 570, and a display module 580. Since the image processing apparatus 500 shown in FIG. 5 is substantially the same as the image processing apparatus 200 shown in FIG. 2, only differences there-between are described below.

The VDC module 560 is coupled between the image capturing module 210 and the image stabilization module 230, and used for receiving Bayer pattern images Img12, performing lens distortion correction on the Bayer pattern images Img12, and transferring corrected Bayer pattern images Img13 to the image stabilization module 230 and the temporal noise reduction module 240 for being processed.

The compression module 570 and the display module 580 are respectively coupled to the spatial noise reduction module 250. The compression module 570 compresses the second noise reduction images Img16 by using, for example, Joint Photographic Coding Expert Group (JPEG) compression standard or H.264 compression standard, and stores the compressed second noise reduction images. The display module 580 can be used to play the second noise reduction images Img16. It should be noted that the second noise reduction images Img16 may be scaled according to a screen size of the display module 580 before playing, so as to produce an image size suitable for being played by the display module 580.

Tables 1 and 2 show usages of the DRAMs which respectively process the conventional image processing apparatus 100 and the image processing apparatus 500 according to this embodiment under the same test conditions. The memory bandwidth is expressed as average mega bits per second (MB/s) required by each module.

TABLE 1

Usage of the DRAM of the conventional image processing apparatus 100.

| Module | Memory bandwidth (MB/s) |
|---|---|
| Image capturing module | 21.24023438 |
| IRP module | 93.85464478 |
| 2-dimensional noise reduction module | 152.19272423 |
| Geometric transform module | 147.557373 |
| Image stabilization module | 42.81921387 |
| In total | 457.66419026 |

TABLE 2

Usage of the DRAM of the image processing apparatus 500 according to this embodiment.

| Module | Memory Bandwidth (MB/s) |
|---|---|
| Image capturing module | 28.83 |

TABLE 2-continued

Usage of the DRAM of the image processing apparatus 500 according to this embodiment.

| Module | Memory Bandwidth (MB/s) |
|---|---|
| IRP module | 81.28 |
| 2-dimensional noise reduction module | 145.4146875 |
| Geometric transform module | 111.06 |
| Image stabilization module | 8.92 |
| Temporal noise reduction module | 70.13 |
| In total | 445.6346875 |

It can be concluded from the test results in Tables 1 and 2 that the bandwidths used by the modules of the image processing apparatus 500 of the present invention are all lower than those used by the same modules of the conventional image processing apparatus 100. Moreover, in addition to the 2-dimensional noise reduction function, the present invention further includes the temporal noise reduction module to achieve the 3-dimensional noise reduction effect; however, the total bandwidth used in this embodiment is still lower than that needed by the conventional image processing apparatus 100.

In summary, the present invention overcomes the disadvantage of inadequate capacity of the DRAM under the conventional architecture, by performing the temporal noise reduction on the Bayer pattern images by using the information of the global motion vectors generated by the image stabilization module. Therefore, the image processing apparatus and the processing method thereof provided in the present invention achieves the 3-dimension noise reduction (3DNR) effect by performing the temporal blending process and the spatial noise reduction, thereby greatly improving the image quality. In addition, the requirement imposed on the DRAM is also decreased in the present invention, so that the overall implementation time is decreased, and the efficiency for processing the image is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing apparatus, comprising:
an image capturing module for capturing a plurality of Bayer pattern images;
an image separation module, coupled to the image capturing module, for decreasing the Bayer pattern images in size and transforming the Bayer pattern images to produce a plurality of first YCbCr format images;
an image stabilization module, coupled to the image capturing module and the image separation module, for receiving Y channel images of the first YCbCr format images and the Bayer pattern images to perform motion estimation, so as to produce a plurality of global motion vectors;
a temporal noise reduction module, coupled to the image capturing module and the image stabilization module, for performing a temporal blending process on the Bayer pattern images according to the global motion vectors, to produce a plurality of first noise reduction images; and
a spatial noise reduction module, coupled to the temporal noise reduction module, for performing 2-dimensional spatial noise reduction on the first noise reduction images to produce a plurality of second noise reduction images.

2. The image processing apparatus according to claim 1, wherein
the temporal noise reduction module aligns the Bayer pattern images according to the global motion vectors, and performs the temporal blending process on color and brightness differences between the Bayer pattern images, to produce the first noise reduction images.

3. The image processing apparatus according to claim 1, further comprising:
a Vertical Distortion Correction (VDC) module, coupled to the image capturing module and the image stabilization module, for receiving the Bayer pattern images captured by the image capturing module, performing lens distortion correction on the Bayer pattern images, and transferring the corrected Bayer pattern images to the image stabilization module for being processed.

4. The image processing apparatus according to claim 1, wherein the spatial noise reduction module comprises:
an Image Reproduce Pipeline (IRP) unit, coupled to the temporal noise reduction module, for transforming the first noise reduction images into a plurality of second YCbCr format images.

5. The image processing apparatus according to claim 4, wherein the spatial noise reduction module comprises:
a geometric transform unit, coupled to the IRP unit, for correcting the second YCbCr format images according to a plurality of affine transformation matrices, so as to compensate geometric distortion.

6. The image processing apparatus according to claim 5, wherein the spatial noise reduction module comprises:
a sharpening and noise reduction unit, coupled to the geometric transform unit, for performing a sharpening process on Y channel images of the second YCbCr format images, and performing 2-dimensional spatial noise reduction on Cb/Cr channel images of the second YCbCr format images, to produce the second noise reduction images.

7. The image processing apparatus according to claim 1, further comprising:
a compression module, coupled to the spatial noise reduction module, for compressing the second noise reduction images, and storing the compressed second noise reduction images.

8. The image processing apparatus according to claim 1, further comprising:
a display module, coupled to the spatial noise reduction module, for playing the second noise reduction images.

9. An image processing method, comprising:
capturing a plurality of Bayer pattern images;
decreasing the Bayer pattern images in size and transforming the Bayer pattern images to produce a plurality of first YCbCr format images;
receiving Y channel images of the first YCbCr format images and the Bayer pattern images to perform motion estimation, so as to produce a plurality of global motion vectors;
performing a temporal blending process on the Bayer pattern images according to the global motion vectors, to produce a plurality of first noise reduction images; and performing 2-dimensional spatial noise reduction on the first noise reduction images to produce a plurality of second noise reduction images.

10. The image processing method according to claim 9, wherein the step of performing the temporal blending process on the Bayer pattern images according to the global motion vectors to produce the first noise reduction images comprises:
aligning the Bayer pattern images according to the global motion vectors, and performing the temporal blending process on color and brightness differences between the Bayer pattern images, to produce the first noise reduction images.

11. The image processing method according to claim 9, wherein after the step of capturing the Bayer pattern images, the method further comprises:
performing Vertical Distortion Correction (VDC) on the Bayer pattern images.

12. The image processing method according to claim 9, wherein the step of performing the 2-dimensional spatial noise reduction on the first noise reduction images to produce the second noise reduction images comprises:
transforming the first noise reduction image into a plurality of second YCbCr format images;
correcting the second YCbCr format images according to a plurality of affine transformation matrices, so as to compensate geometric distortion; and
performing a sharpening process on Y channel images of the second YCbCr format images, and performing 2-dimensional spatial noise reduction on Cb/Cr channel images of the second YCbCr format images, to produce the second noise reduction images.

13. The image processing method according to claim 9, wherein after the step of producing the second noise reduction images, the method further comprises:
compressing the second noise reduction images, and storing the compressed second noise reduction images.

14. The image processing method according to claim 9, wherein after the step of producing the second noise reduction images, the method further comprises:
transferring the second noise reduction images to a display module for playing the second noise reduction images.

* * * * *